United States Patent
Kaneko

(10) Patent No.: US 6,886,952 B2
(45) Date of Patent: May 3, 2005

(54) VARIABLE SHAPE MIRROR AND ITS MANUFACTURING METHOD

(75) Inventor: Shinji Kaneko, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/773,840

(22) Filed: Feb. 5, 2004

(65) Prior Publication Data

US 2004/0156131 A1 Aug. 12, 2004

Related U.S. Application Data

(62) Division of application No. 10/007,469, filed on Nov. 7, 2001, now Pat. No. 6,726,338.

(30) Foreign Application Priority Data

Nov. 16, 2000 (JP) ......................................... 2000-349925
Nov. 16, 2000 (JP) ......................................... 2000-349926

(51) Int. Cl.[7] .............................................. G02B 7/182
(52) U.S. Cl. ........................ 359/846; 359/847; 359/848; 359/993
(58) Field of Search ................................. 359/846–849, 359/883–884, 224–227, 665–666, 290–293, 868

(56) References Cited

U.S. PATENT DOCUMENTS

| 3,322,483 | A | | 5/1967 | Jones |
| 3,942,880 | A | | 3/1976 | Zeiders, Jr. |
| 4,021,754 | A | | 5/1977 | Colao |
| 4,091,274 | A | | 5/1978 | Angelbeck et al. |
| 4,093,351 | A | * | 6/1978 | Perkins et al. ............... 359/847 |
| 4,618,223 | A | | 10/1986 | Fried |
| 4,959,531 | A | | 9/1990 | Marino |
| 5,022,745 | A | | 6/1991 | Zayhowski et al. |
| 5,109,300 | A | * | 4/1992 | Waddell ...................... 359/847 |
| 6,438,149 | B1 | * | 8/2002 | Tayebati et al. ............... 372/45 |
| 6,525,880 | B2 | * | 2/2003 | Flanders et al. ............ 359/578 |
| 6,608,711 | B2 | * | 8/2003 | Flanders et al. ............ 359/224 |

FOREIGN PATENT DOCUMENTS

| JP | 01-219801 A | 9/1989 |
| JP | 02-101402 A | 4/1990 |
| JP | 3-81132 B2 | 12/1991 |

* cited by examiner

*Primary Examiner*—Mohammad Sikder
(74) *Attorney, Agent, or Firm*—Frishauf, Holtz, Goodman & Chick, P.C.

(57) ABSTRACT

A variable shape mirror comprises a frame member having an opening, and a thin film having a first region including a reflecting plane and a second region of higher rigidity than the first region disposed in the outer periphery of the first region, being supported in the opening of the frame member. Other variable shape mirror comprises a frame member having a first opening and a second opening, a first thin film having a reflecting plane, forming an electrode, and supported in the first opening of the frame member, a second thin film forming an electrode electrically conducting with the electrode of the first thin film, and supported in the second opening of the frame member, and a substrate bonded to the frame member at a specified interval, and having an electrode at a position opposite to the electrode of the second thin film.

2 Claims, 8 Drawing Sheets

VARIABLE SHAPE MIRROR AND ITS MANUFACTURING METHOD

CROSS-REFERENCE TO RELATED APPLICATIONS

The present application is a divisional application of U.S. application Ser. No. 10/007,469, filed Nov. 7, 2001, now U.S. Pat. No. 6,726,338, which is based upon and claims the benefit of priority from the prior Japanese Patent Applications No. 2000-349925, filed Nov. 16, 2000; and No. 2000-349926 filed Nov. 16, 2000, the entire contents of both of which are incorporated herein by reference.

BACKGROUND OF THE INVENTION

1. Field of the Invention

The present invention relates to a variable shape mirror and its manufacturing method, and more particularly to a small variable shape mirror applying the semiconductor technology and its manufacturing method, in a variable shape mirror capable of varying the curvature continuously.

2. Description of the Related Art

In a micro optical system applied in photo pickup or other micro optics, hitherto, for the purpose of simplifying the mechanism relating to focusing by using electromagnetic actuator, an ultrasmall variable focus mirror capable of varying the curvature of the reflection plane has been proposed.

In a small photographic optical system, application of variable focus mirror contributes to reduction of size.

Such variable focus mirror is expected to be manufactured at low cost and high precision by applying the so-called MEMS (Micro Electro-Mechanical System) based on the semiconductor manufacturing technology.

As an example of such technology, a reflecting mirror device as a variable focus mirror is disclosed in Jpn. Pat. Appln. KOKAI Publication No. 2-101402.

The reflecting mirror device disclosed in Jpn. Pat. Appln. KOKAI Publication No. 2-101402 is explained briefly by referring to FIGS. 8A and 8B, and FIGS. 9A to 9E.

FIGS. 8A and 8B are sectional view and perspective view showing the configuration of the reflecting mirror device of electrostatic attraction driving system disclosed in Jpn. Pat. Appln. KOKAI Publication No. 2-101402.

In FIGS. 8A and 8B, reference numeral 11 is a glass or other insulating substrate. (hereinafter called glass substrate), and a fixed side electrode layer 12 of conductive thin film is applied on the top of the glass substrate 11.

Reference numeral 13 is a silicon or other semiconductor substrate (hereinafter called silicon substrate), and a silicon dioxide thin film 14 is formed as a insulating film on a principal plane of the silicon substrate 13.

Reference numeral 15 is a vacancy formed on other principal plane in the central part of the silicon substrate 13, and this vacancy 15 is to set the central part of the silicon dioxide thin film 14 displaceably in the thickness direction.

Reference numeral 16 is a movable side electrode layer, and this variable side electrode layer 16 is laminated on the thin silicon dioxide film 14.

The central parts of the silicon dioxide thin film 14 and movable side electrode layer 16 form a reflecting mirror section 17.

The reflecting mirror section 17 is recessed and deformed to the fixed side electrode layer 12 side by the voltage applied both electrode layers of the fixed side electrode layer 12 and movable side electrode layer 16.

The silicon substrate 13 is bonded to the glass substrate 11 by way of a spacer member 18, with the silicon dioxide thin film 14 side downward.

Also, in FIGS. 8A and 8B, reference numeral 19 is a silicon dioxide thin film formed on other principal plane of the silicon substrate 13.

This reflecting mirror device is manufactured according to the manufacturing process diagrams shown in FIGS. 9A to 9E.

FIGS. 9A to 9E are sectional views for explaining the manufacturing process of the reflecting mirror device of electrostatic attraction driving system disclosed in Jpn. Pat. Appln. KOKAI Publication No. 2-101402.

First, as shown in FIG. 9A, silicon dioxide thin films 19 and 14 of 400 to 500 nm in thickness are formed on both sides of a silicon substrate 13 of plane azimuth <100> of which both sides are polished to mirror smoothness.

A gold thin film 16 of about 100 nm in thickness is applied on the silicon dioxide thin film 14 of the lower side.

Next, as shown in FIG. 9B, a photo resist 20 of specified pattern is applied on the silicon dioxide thin film 19, and a circular window opening 21 is formed by photolithography.

With the lower side of the substrate in protected state, a window is opened in the silicon dioxide thin film 14 by a hydrofluoric acid solution, using the photo resist 20 as mask.

Further, as shown in FIG. 9C, the silicon substrate 13 is immersed in an aqueous solution of ethylene diamine pyrocatechol, and the silicon substrate is etched from the area of the window opening 21.

At this time, as shown in the drawing, etching is stopped when the silicon dioxide 16 at the lower side is exposed.

Thus, a thin film of reflecting mirror section 17 composed of silicon dioxide film 14 and gold thin film 16 is left over.

On the other hand, in other process than mentioned above, as shown in FIG. 9D, a metal film of 100 nm in thickness is formed as a fixed side electrode layer 12 on the top of a glass substrate 11 of 300 nm in thickness.

Then, as shown in FIG. 9E, a silicon substrate 13 is adhered on the glass substrate 11 by way of a polyethylene spacer member 18 of about 100 $\mu$m in thickness, so that a reflecting mirror device is manufactured as shown in FIGS. 8A and 8B.

This variable focus mirror manufactured by adhering substrates as disclosed in Jpn. Pat. Appln. KOKAI Publication No. 2-101402 involves the following first and second problems when applied in the optical system where a high focusing performance is required such as a high definition camera.

The first problem is about the opening shape of the upper substrate on which the reflecting plane is formed.

That is, to form an opening, it is most preferable to etch by using an alkaline solution such as aqueous solution of ethylene diamine pyrocatechol mentioned above or potassium hydroxide from the viewpoint of cost and combination with thin film members.

By etching, however, due to crystal azimuth dependence of the silicon substrate, an accurate circular or elliptical opening shape cannot be obtained.

If the opening is square or polygonal, the deformation of the reflecting plane due to stress is asymmetrical, and the astigmatism increases, and the focusing performance is lowered.

The second problem is distortion of the upper substrate in the assembling process.

That is, the upper substrate is a single crystal silicon substrate, and a high mirror flatness is achieved, but when bonding with the lower substrate, or due to stress caused in the connection process for leading out the electrode of the upper substrate to the external lead, the upper substrate is slightly deformed, and an adverse effect is caused on the mirror focusing performance.

This problem may be somewhat avoided by keeping the junction position of the substrates or the connection position of the electrode of the upper substrate to the external part sufficiently away from the mirror opening area, but, as a result, the entire size of the mirror element is increased, which is contradictory to requirements of smaller size and lower cost of the optical system.

Incidentally, as the driving method of this kind of variable shape mirror, aside from the method of using electrostatic attraction force disclosed in Jpn. Pat. Appln. KOKAI Publication No. 2-101402, a method of using piezoelectric effect disclosed in Jpn. Pat. Appln. KOKOKU Publication No. 3-81132, and a method of using fluid pressure disclosed in Jpn. Pat. Appln. KOKAI Publication No. 1-219801 are known.

These methods have their own merits and demerits, but the method of using fluid pressure is advantageous in an application where very high response is not required but a relatively large displacement is needed from the concave surface to the convex surface.

As an example of a variable shape mirror of such fluid pressure drive, the technique disclosed in Jpn. Pat. Appln. KOKAI Publication No. 1-219801 is briefly explained by referring to FIG. 10.

This variable focus mirror 1 is composed of a shell 2, chamber pressure adjusting device 3, and a reflecting mirror 4.

A pressure chamber 5 is formed in the shell 2, and a holder 7 for holding the reflecting mirror 4 airtight by O-rings 6 is formed in its opening.

In the pressure chamber 5, a pressure gauge 8 and a piping 9 of the chamber pressure adjusting device 3 are connected.

The piping 9 is composed of a compressor piping system 9a and a vacuum pump piping system 9b, and which are changed over appropriately between a compressor 21a and a vacuum pump 21b by means of electromagnetic operation valves 10a, 10b.

To change over, the electromagnetic operation valves 10a, 10b are opened or closed by a controller 22.

The reflecting mirror 4 is made of a thin plate, and its reflecting plane 23 is coated with a reflecting material such as aluminum.

In the variable focus mirror 1 having such configuration, to form a concave reflecting plane 23a, the controller 22 is operated to close the electromagnetic operation valve 10a and open the electromagnetic operation valve 10b.

As a result, the pressure chamber 5 communicates with the vacuum pump piping system 9b, and is evacuated to a negative pressure by the vacuum pump 21b.

In this state, therefore, the reflecting mirror 4 is deflected to the side of the pressure chamber 5, and a concave reflecting plane 23a is formed.

On the other hand, to form a convex reflecting plane 23b, the controller 22 is operated to open the electromagnetic operation valve 10a and close the electromagnetic operation valve 10b.

As a result, the pressure chamber 5 communicates with the compressor piping system 9a, and is compressed to a positive pressure by the compressor 21a.

In this state, therefore, the reflecting mirror 4 is deflected to the opposite side of the pressure chamber 5, and a convex reflecting plane 23b is formed.

Further, by controlling the pressure in the pressure chamber 5 to be equal to the atmospheric pressure, the reflecting plane 23 maintains a flat reflecting plane 23c by its own elasticity.

The shape of the reflecting plane 23 can be varied by controlling the operation of the controller 22 according to the measurement of the pressure gauge 8, and the reflecting mirror 4 can be continuously set to an arbitrary focal length.

The variable shape mirror using such fluid pressure as driving source is particularly suitable to the application where change of focal distance in a wide range is required, as compared with the electrostatic attraction driving system in which the displacement is limited by the distance between electrodes or the piezoelectric driving system which is difficult to give a large deflection due to limit in the material of the reflecting plane.

The problem of the variable shape mirror using such fluid pressure as driving source is that it is difficult to reduce in size because pump or compressor is needed.

However, owing to the recent progress in micro machine technology, ultrasmall pumps applying the semiconductor manufacturing technology have been developed, and by using them, it is expected to realize a variable shape mirror of fluid pressure type to be assembled in a small device.

Nevertheless, the ultrasmall pump formed by the micro machine technology, generally, cannot generate a large pressure difference in a short time, and it is required to form the thin film as the reflecting plane by using a material of a very small rigidity, so that a large displacement may be obtained by a small pressure difference.

In this case, for precise control of displacement, pressure measurement of a very high resolution is needed, but if a pressure measuring instrument having such high precision, a third problem is caused, that is, the size cannot be reduced and the cost is increased.

BRIEF SUMMARY OF THE INVENTION

In the light of the first and second problems, it is hence an object of the invention to present a variable shape mirror of small size and low cost capable of obtaining a high focusing performance, and its manufacturing method.

Other object of the invention is devised in the light of the third problem, and is intended to present a variable shape mirror having a displacement measuring function of small size and low cost.

To achieve the objects, according to the present invention, there is provided a variable shape mirror comprising:

a frame member having an opening; and a thin film having a first region including a reflecting plane and a second region of higher rigidity than the first region disposed in the outer periphery of the first region, being supported in the opening of the frame member.

Also to achieve the objects, according to the present invention, there is provided a variable shape mirror comprising:

a frame member having a first opening and a second opening;

a first thin film having a reflecting plane, forming an electrode, and supported in the first opening of the frame member;

a second thin film forming an electrode electrically conducting with the electrode of the first thin film, and supported in the second opening of the frame member;

a substrate bonded to the frame member at a specified interval, and having an electrode at a position opposite to the electrode of the second thin film; and a conductive protrusion disposed on the electrode of the second thin film or the electrode of the substrate, and having a height higher than the specified interval.

Also to achieve the objects, according to the present invention, according to the present invention, there is provided a variable shape mirror comprising:

a frame member having an opening;

a thin film having a reflecting plane supported in the opening of the frame member; and a substrate bonded to the frame member at a specified interval by way of a spacer, wherein the space between the portion of the frame member having the opening and the substrate is not closed.

Moreover, to achieve the objects, according to the present invention, there is provided a manufacturing method of variable shape mirror for bonding a frame member of reflecting plane side of variable shape and a substrate at a specified interval, comprising:

applying a photosensitive coating material on either the frame member or the substrate, exposing by using a specified mask, and developing to form a spacer; and bonding the other one of the frame member or the substrate to the spacer, and heating to adhere together.

To achieve the objects, according to the present invention, there is provided a variable shape mirror comprising:

a thin film having a reflecting plane;

a member for supporting the thin film;

means which deforms the thin film; and a sensor formed in part of the thin film for detecting the deformation of the thin film.

The sensor for detecting the deformation of the thin film is a distortion sensor formed on the outer circumference of the thin film.

The outer circumference is greater in film thickness as compared with the central part of the thin film.

Also to achieve the objects, according to the present invention, there is provided a variable shape mirror comprising:

a frame member having at least a first opening and a second opening;

a first thin film having a reflecting plane supported in the first opening of the frame member;

a second thin film supported in the second opening of the frame member;

means which deforms the first thin film and second thin film by applying an equal fluid pressure to the first thin film and second thin film; and a sensor formed in part of the second thin film for detecting the deformation of the second thin film.

The frame member is mainly composed of single crystal silicon.

The second thin film has a protrusion projecting from the frame member made of a thin film of single crystal silicon, in the peripheral area of the second opening.

The sensor for detecting the deformation of the second thin film is formed on the protrusion.

Further, to achieve the objects, according to the present invention, there is provided a small variable shape mirror applying semiconductor technology comprising:

a frame member made of single crystal silicon having an opening;

a polyimide thin film having a reflecting plane for covering the opening;

means which deforms the thin film by applying a fluid pressure to the thin film; and a distortion sensor for detecting the change of resistance value of resistance pattern formed on the thin film exposed to the fluid pressure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

Figure 1:
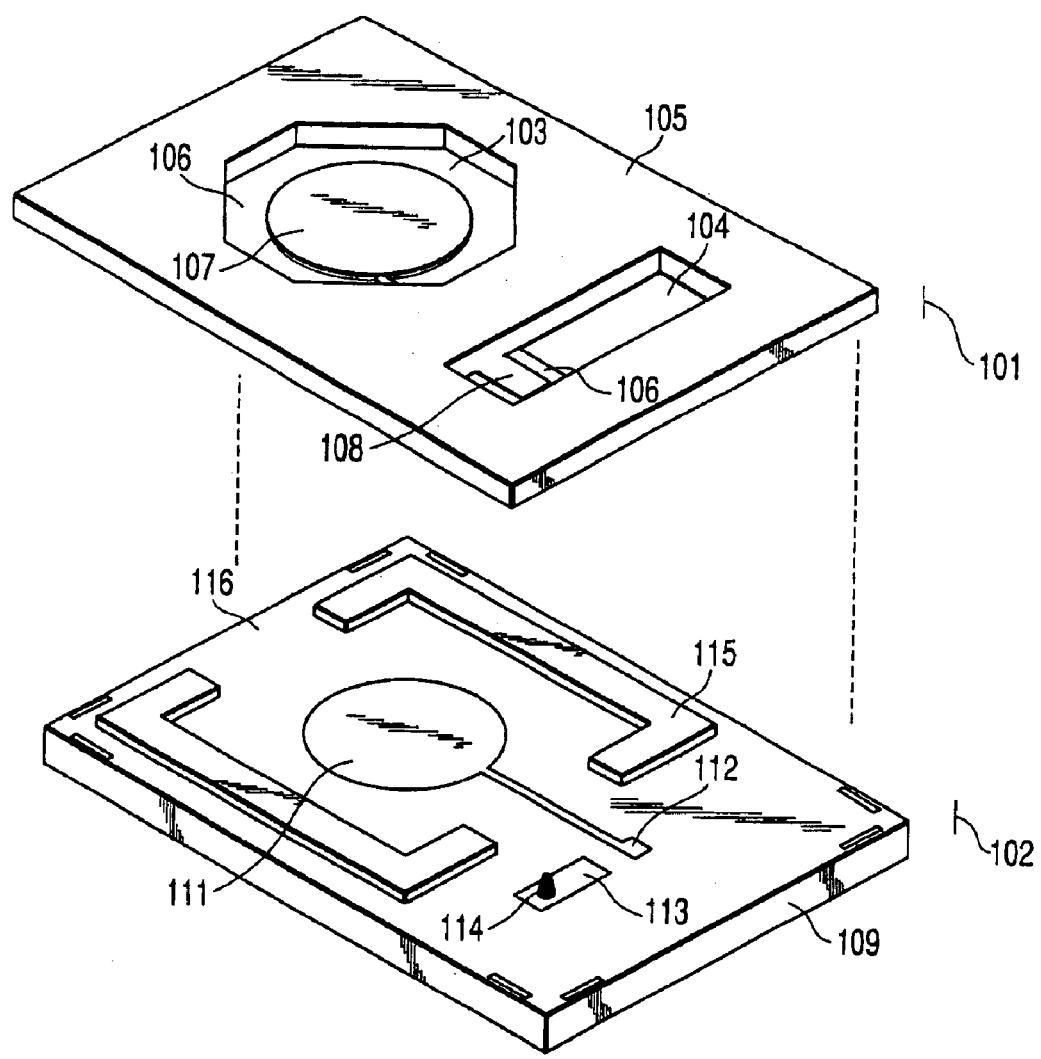
FIG. 1 is a perspective exploded view showing a configuration of a variable shape mirror according to a first embodiment of the invention.

Reference will now be made in detail to the presently preferred embodiments of the invention as illustrated in the accompanying drawings, in which like reference numerals designate like or corresponding parts.

(First Embodiment)

Referring now to FIGS. 1 to 3A and 3B, a first embodiment of the invention is described below.

In this embodiment, a variable shape mirror is composed by bonding together an upper substrate having a reflecting plane of variable shape and an upper electrode, and a lower substrate having a lower electrode.

FIG. 1 is a perspective exploded view showing a configuration of the variable shape mirror according to the first embodiment of the invention.

That is, an upper substrate 101 and a lower substrate 102 are shown in FIG. 1.

The upper substrate 101 is mainly composed of a frame member 105 made of single crystal silicon, having a mirror opening 103 and an electrode opening 104.

On the surface of this frame member 105 (the lower side in FIG. 1), a polyimide film 106 is formed as described below.

An upper electrode 107 comprising the reflecting section of the variable shape mirror is formed in a specified region in the back side of the mirror opening 103 of the polyimide film 106. The polyimide film 106 of the region formed the upper electro 107 is sufficiently thin as to transmit the light.

An upper electrode pad 108 drawn out from the upper electrode 107 is disposed in the end portion of the electrode opening 104.

The polyimide film 106 in the electrode opening 104 is removed except for the portion of the upper electrode pad 108 and its surrounding.

On the other hand, in the lower substrate 102 formed of single crystal silicon substrate 109, a lower electrode 111 and a first electrode pad 112 drawn out therefrom, and a second electrode pad 113 electrically separated from the lower electrode 111 are formed by way of an insulating film 110 (not shown).

In a specified region of the second electrode pad 113, an Au bump 114 is formed.

Around the lower electrode 111, a spacer 115 of negative type thick film photo resist is disposed.

Herein, the spacer 115 does not surround the entire periphery of the lower electrode 111, but is disposed with a notch 116.

The height of the spacer 115 is slightly lower than that of the Au bump 114.

Figure 2A:
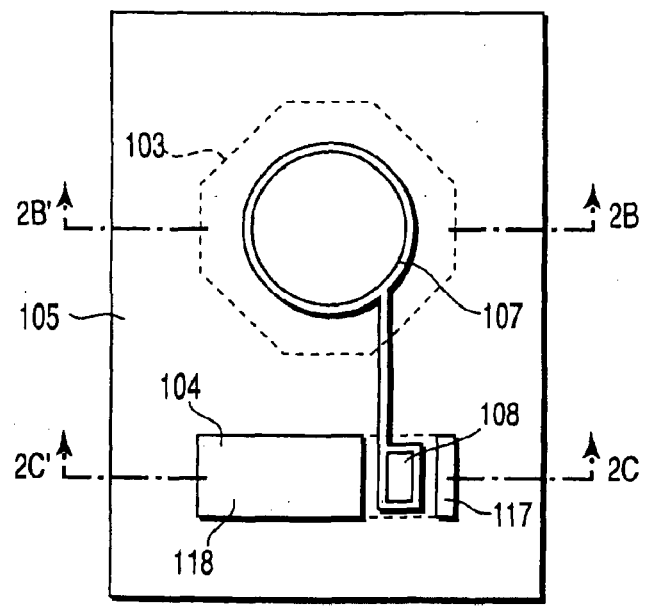
FIGS. 2A, 2B, 2C are respectively a top view showing the detail of the structure of an upper substrate 101 in FIG. 1, a 2B–2B' sectional view, and a 2C–2C' sectional view in the top view.
Figure 2B:
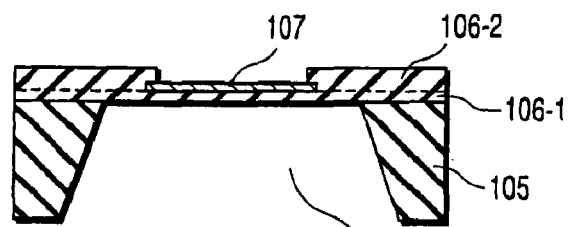
Figure 2C:
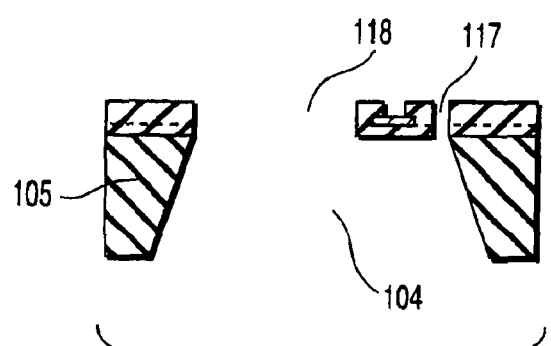

FIGS. 2A, 2B, 2C are respectively a top view showing the detail of the structure of the upper substrate 101 in FIG. 1, a 2B–2B' sectional view, and a 2C–2C' sectional view in the top view.

The top view in FIG. 2A corresponds to the view from the lower side of the upper substrate 101 in FIG. 1.

In the mirror opening 103 of the frame member 105, a thin film composed of lower layer polyimide film 106-1, upper electrode 107, and upper layer polyimide film 106-2 is left over, and the upper layer polyimide film 106-2 immediately on the upper electrode 107 is removed except for a slight region of the outer circumference.

On the other hand, the polyimide film 106 in the electrode opening 104 is present only in the region of the upper electrode pad 108 drawn out from the upper electrode 107 and a slight region of its circumference.

Specifically, the polyimide film 106 is removed in the regions 117 and 118 in FIG. 2C.

The upper electrode pad 108 is supported on the frame member 105 by the polyimide film 106 like a bracket supported at both ends.

Of the polyimide film 106 left over in the electrode opening 104, the upper layer polyimide film 106-2 is removed in the region immediately on the upper electrode pad 108, and the upper side of the upper electrode pad is exposed.

The upper layer polyimide film 106-2 is sufficiently thick as compared with the lower layer polyimide film 106-1 or upper electrode 107.

Figure 3A:
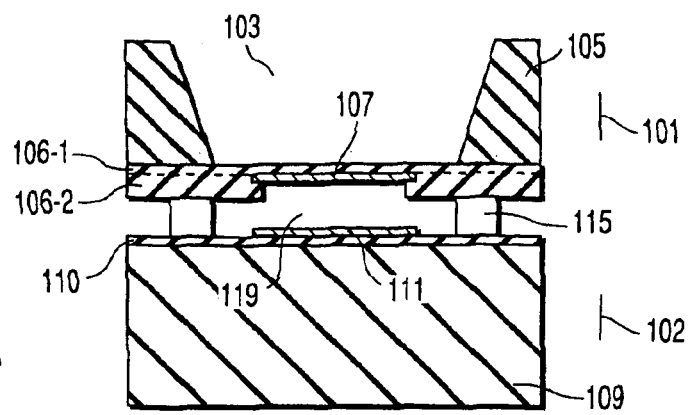
FIGS. 3A and 3B are diagrams showing the regions corresponding to 2B–2B' sectional view and 2C–2C' sectional view shown in FIGS. 2B and 2C, relating to the sectional structure after bonding of upper substrate 101 and lower substrate 102 in FIG. 1.
Figure 3B:
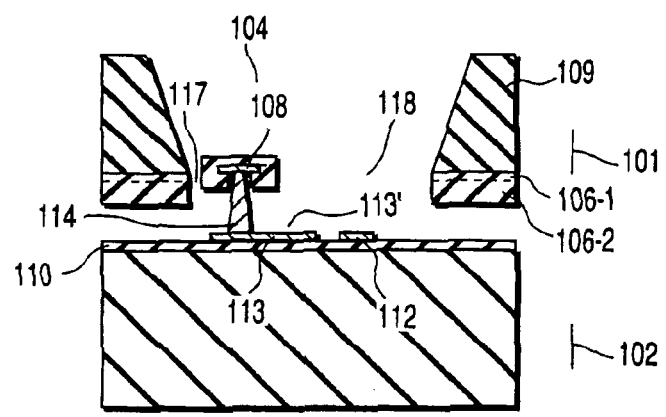

The sectional structure after bonding of upper substrate 101 and lower substrate 102 is explained by referring to FIGS. 3A and 3B.

FIGS. 3A and 3B are diagrams showing the regions corresponding to 2B–2B' sectional view and 2C–2C' sectional view shown in FIGS. 2B and 2C, relating to the sectional structure after bonding of upper substrate 101 and lower substrate 102 in FIG. 1.

In the bonding process, the spacer 115 of negative type thick film photo resist is also used as an adhesive.

Specifically, using a flip chip bonder or the like, the upper substrate 101 and lower substrate 102 are aligned, and by applying a very small force and heating, the both substrates 101 and 102 are bonded together.

At this time, in the manufacturing process of the lower substrate 102, the negative type thick film photo resist is applied by spin coating, exposed by an ordinary exposure device by using a specified mask, developed, and heated at a relatively low temperature.

Afterwards, the upper substrate 101 is put on the lower substrate 102, and heated at high temperature, so that a sufficient adhesion strength is achieved between the lower substrate 102 and upper substrate 101.

For example, in a general negative type photo resist, the heat treatment at relatively low temperature in the manufacturing process of the lower substrate 102 is conducted at about 80° C., and the heat treatment at high temperature for bonding is done at about 150° C.

Thus, by using the negative type thick film photo resist between the two substrates 101 and 102, a spacer of a uniform thickness can be easily formed by spin coating, and a stable bonding is realized by minimizing the suppressing force when adhering the substrates 101 and 102.

In this case, uniform height of the spacer position and small suppressing force during adhesion are extremely important for suppressing distortion of the substrates 101 and 102 during bonding.

Accordingly, in 2B–2B' section, being bonded to the polyimide film 106 on the frame member 105 of the upper substrate 101 on the surface of the spacer 115 formed on the lower substrate 102, the interval of the two substrates 101 and 102 is defined accurately according to the height of the spacer 115.

In 2C–2C' section, the upper electrode pad 108 corresponds to the upper part of the Au bump 114 formed on the second electrode pad 113 of the lower substrate 102.

Herein, too, the interval of the two substrates 101 and 102 is defined by the height of the spacer 115, but as mentioned above, since the height of the Au bump 114 is slightly higher than the height of the spacer 115, the upper electrode pad 108 contacts with the Au bump 114, and is slightly pushed up together with the surrounding polyimide film 106.

At this time, since the polyimide film 106 is supported by the frame member 105 at both ends, a stable electric bond is obtained between the Au bump 114 and upper electrode pad 108 by the tension of the polyimide film 106.

In this configuration, the first electrode pad 112 conducts with the lower electrode 111, and the second electrode pad 113 conducts with the upper electrode 107.

Therefore, by applying a voltage to the two electrode pads 112 and 113, an electrostatic attraction acts between the upper electrode 107 and lower electrode 111, and the upper electrode 107 is deformed together with the lower layer polyimide film 106-1 in its region, so that a desired curvature may be obtained.

In this case, the upper electrode 107 functions as a reflecting plane, but other thin metal film may be formed after bonding by vapor deposition or other method and may be used as a reflecting plane.

At this time, the electrostatic force acts in the region between the upper electrode 107 and lower electrode 111, but in the region not forming the upper electrode 107 in the region of the mirror opening 103, since the upper layer polyimide film 106-2 is formed aside from the lower layer polyimide film 106-1, the rigidity is sufficiently higher than in the region of the upper electrode 107, and deformation is very small.

For this reason, the deformation region of the polyimide film 106 is limited approximately to a region on which the relatively low rigid upper electrode 107. That is, the deformation region of the polyimide film 106 is defined by the shape of the opening in the upper layer polyimide film 106-2.

Now, in general, when the opening 103 in the silicon substrate is formed by utilizing anisotropic etching, it is difficult to form the opening in a complete circle or an oval shape. Therefore, when the deformed shape of the polyimide film 106 is defined along the shape of the opening in the silicon substrate which is formed by the anisotropic etching, strain may occur in the deformation obtained when voltage is applied between the upper electrode 107 and the lower electrode 111. On the other hand, in the present embodiment, as mentioned above, the deformation region of the polyimide film 106 is dependent on the opening shape in the upper layer polyimide film 106-2. Also, since this opening shape is formed by transferring the shape of the photolithography mask accurately, it is easy to form the opening shape of the upper layer polyimide film 106-2 in a complete circle or an oval shape.

Therefore, in the variable shape mirror of this embodiment a deformation region of the polyimide film 106 can be defined regardless of the shape of the mirror opening 103, and lowering of focusing performance due to inappropriate shape of mirror opening can be lessened and can obtain focusing performance having a small astigmatism.

Herein, for lead wire connection from outside, in a region (see reference numeral 113' in FIG. 3B) remote from the first electrode pad 112 and Au bump 114 of second electrode pad 113, since it can be directly connected to the lower substrate 102 through a region 118 removing the polyimide film in the electrode opening 104 of the upper substrate 101, such connection process as to apply stress to the upper substrate 101 is not needed.

That is, since the upper electrode 107 can shift the lead wire connection position to the lower electrode 111 while keeping a stable conduction by a slight tension of the thin film formed of polyimide film 106 and upper electrode 107, distortion of the frame member 105 is very small as compared with a case of connecting lead wires directly to the upper substrate 107, or a case of conducting the electrode of the lower substrate 102 by soldering or other process, so that lowering of focusing performance may be avoided.

Although not shown in FIGS. 3A and 3B, a notch 116 is formed in the spacer 115 as shown in FIG. 1, and when the mirror position is deformed due to electrostatic attraction, the air in the spatial region between the two substrates 101 and 102 defined by the spacer 115 smoothly flows out, so that lowering of response due to air suction and sweeping in this region can be lessened.

A manufacturing method of the variable focus mirror of the embodiment is briefly explained. The upper substrate 101 and lower substrate 102 are manufactured on a silicon wafer by applying an ordinary semiconductor process, and individual devices are assembled after dicing the substrates.

Accordingly, the spacer 115 can be formed in the lower substrate 102 in batch by photolithography, which is more advantageous in the aspects of cost and manufacturing stability than the method of gluing spacer members to individual chips.

Further, by dicing after bonding the upper substrate 101 and lower substrate 101 forming multiple chips in wafer state, it is particularly beneficial from the viewpoint of manufacturing cost.

In this embodiment, in order to enhance the rigidity in the region of the mirror opening 103 not forming the upper electrode 107, the upper layer polyimide layer 106-2 of a relatively thick size is used, but it may be replaced by a ceramic thin film or other material of a high elasticity.

Also in the embodiment, the spacer 115 and Au bump 114 re formed on the lower substrate 102, but they may be formed on the, upper electrode 101, or on both upper electrode 101 and lower electrode 102.

As described herein, according to the first embodiment of the invention, the variable shape mirror of small size and high focusing performance is obtained at a low cost, and its manufacturing method is presented.

(Second Embodiment)

Figure 4:
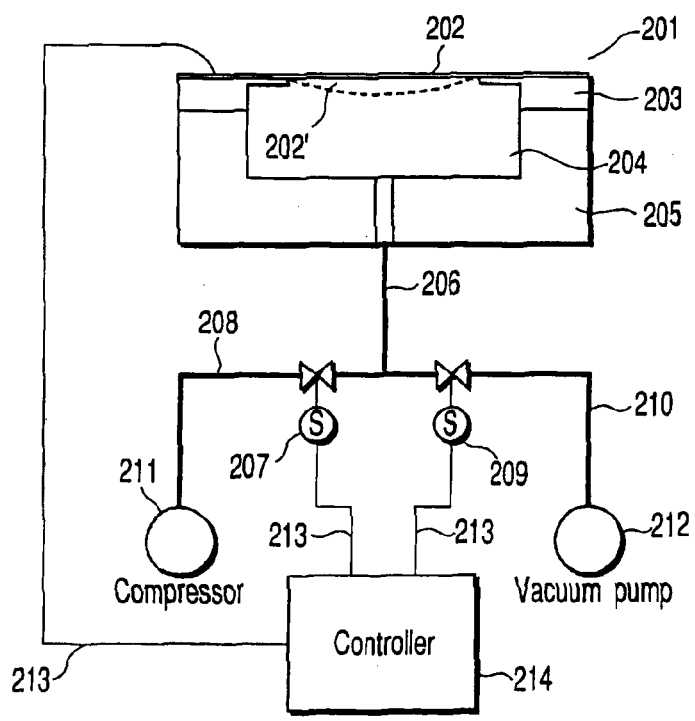
FIG. 4 is a diagram showing an entire configuration of variable shape mirror according to a second embodiment of the invention.
Figure 5A:
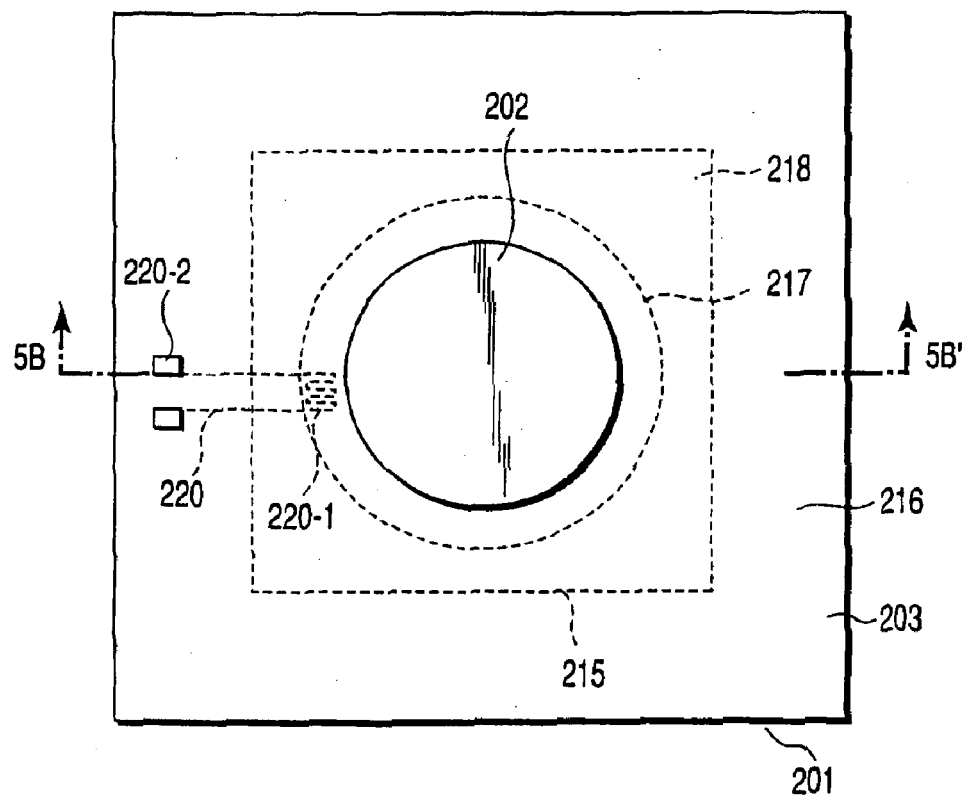
FIGS. 5A and 5B are a top view of detail of variable shape mirror 201 in FIG. 4, and its 5B–5B' sectional view.
Figure 5B:
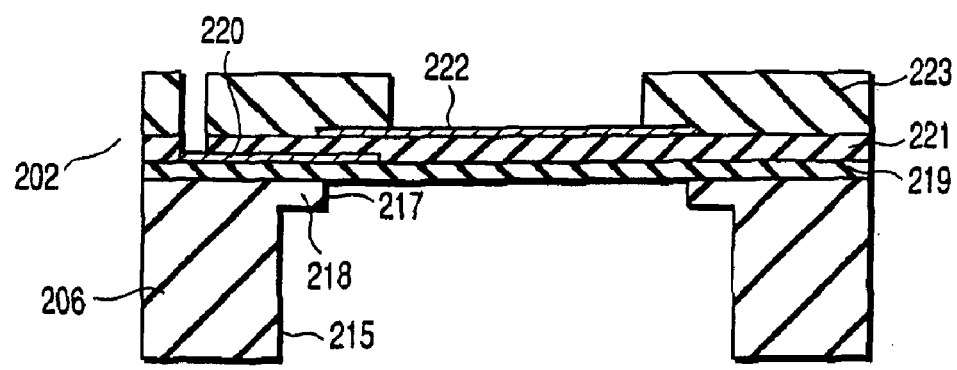

A second embodiment of the invention is explained by referring to FIGS. 4, 5A and 5B.

FIG. 4 shows an entire configuration of a variable shape mirror according to this embodiment.

As shown in FIG. 4, a variable shape mirror 201 comprises a thin film 202 having a reflecting plane, which is supported by a frame member 203.

The variable shape mirror 201 is hermetically sealed in a shell 205 having a pressure chamber 204.

A piping 206 communicating with the pressure chamber 204 is connected to the shell 205.

The piping 206 is branched into a piping 208 having a solenoid valve 207, and a piping 210 having a solenoid valve 209.

Other end of the piping 208 is connected to a compressor 211, and other end of the piping 210 is connected to a vacuum pump 212.

The solenoid valves 207 and 209 are connected to a controller 214 by way of a wiring 213.

In the thin film 202 of the variable shape mirror 201, a distortion sensor (not shown) is formed as described below.

The thin film 202 of the variable shape mirror 201 is also connected to the controller 214 through the wiring 213.

Herein, by controlling the solenoid valves 207 and 209 adequately by the controller 214, for example, when the pressure chamber 204 is set to a negative pressure, the thin film 202 is deflected to the side of the pressure chamber 204 as indicated by broken line 202' in the diagram.

FIGS. 5A and 5B show the detail of the variable shape mirror 201.

That is, FIGS. 5A and 5B are a top view of detail of the variable shape mirror 201 in FIG. 4, and its 5B–5B' sectional view.

As shown in FIGS. 5A and 5B, the frame member 203 is made of single crystal silicon, and consists of a thick film region 216 having a rectangular opening 215, and a thin film region 218 having a circular opening 217 disposed in this rectangular opening 215.

On the surface of the frame member 203, the thin film 202 is formed including the opening region.

The thin film 202 is a five-layer structure laminating, from the side of the frame member 203, sequentially a first polyimide film 219, a nickel-chromium alloy thin film pattern 220, a second polyimide film 221, an aluminum (Al) thin film pattern 222 as reflecting film, and a third polyimide film 223.

The third polyimide film 223 is sufficiently thicker than the first polyimide film 219, nickel-chromium alloy thin film pattern 220, second polyimide film 221, and Al thin film pattern 222.

The Al thin film pattern 222 covers the entire surface of the circular opening 217.

The third polyimide film 223 is removed in the central part of the circular opening 217, and is slightly swollen out to the inside of the circular opening.

The nickel-chromium alloy thin film pattern 220 composes a resistance pattern 220-1 in the existing region of the third polyimide film 223 inside of the circular opening 217, and is drawn out to the electrode pad 220-2 in the thick film region 216 by way of the thin film region 218.

In the second polyimide film 221 and third polyimide film 223, an opening is formed in the region of the electrode pad 220-2.

In this region forming the opening, the nickel-chromium alloy thin film pattern 220 is exposed.

The electrode pad 220-2 is connected to the controller 214 by way of the wiring 213 in FIG. 4.

The controller 214 has a function of measuring the resistance value of the resistance pattern 220-1.

In this embodiment, same as in the method disclosed in Jpn. Pat. Appln. KOKAI Publication No. 1-219801, the thin film 202 is deformed by controlling the opening and closing state of the solenoid valves 207 and 209 by the controller 214.

At this time, along with deformation of the thin film 202, a bending stress occurs in the region forming the resistance pattern 220-1, and the resistance value is changed in the resistance pattern 220-1.

Detecting the change of the resistance value in the resistance pattern 220-1, distortion shape of the thin film 202 is controlled by feedback.

Thus, according to the embodiment, since the distortion sensor (substantially functioning as pressure sensor) is directly formed in the thin film 202, it is advantageous from the viewpoint of reduction of size and cost as compared with a case of preparing a separate pressure sensor.

In the embodiment, since the deformation of the thin film 202 itself is detected, in the case of driving by a very small pressure difference by setting the film rigidity very low, an accurate measurement of distortion is possible.

When the thin film 202 is deformed in a concave profile as indicated by dotted line 202' in FIG. 4, the resistance pattern 220-1 receives compressive distortion in the principal current direction, and hence the resistance value is decreased as compared with the case of a flat profile.

On the other hand, when the thin film 202 is deformed in a convex profile, the resistance pattern 220-1 receives tensile distortion in the principal current direction, and hence the resistance value is increased as compared with the case of a flat profile.

Incidentally, concerning the surface distortion in the region of the thin film 202 not forming the third polyimide film 223, for example, at the lower side, if the film distortion is very small, a tensile distortion occurs when the thin film 202 is deformed in a convex profile, and a compressive distortion occurs when deformed in a concave profile.

By contrast, in the case of relatively large deflection of film and relatively large elongation of film in the plane direction, a tensile distortion occurs whether the thin film 202 is deformed in a concave profile or in a convex profile.

Therefore, the deflection amount cannot be determined directly from the change of the resistance value of the resistance pattern 220-1 formed in this region.

However, as in this embodiment, when the outer circumference of the thin film 202 is increased in thickness by the presence of the third polyimide film 223, the deformation amount in this region is small, and, as a result, the resistance value change is directly obtained from the deflection of the thin film 202 in a wide range.

Thus, according to the embodiment, an accurate feedback control is realized for deflection in a relatively wide range.

If the third polyimide film 223 is extremely thick, meanwhile, the deflection amount in this region is extremely small, and it is optimized in the range where the deformation amount in the region of the Al thin film 222 can be directly measured from the resistance value change of the resistance pattern 220-1, corresponding to the necessary deformation amount of the Al thin film 222 used as reflecting film.

In the embodiment, the resistance pattern 220-1 is nickel-chromium alloy, but other thin film material of small temperature resistance coefficient such as copper-nickel alloy may be also used.

In the embodiment, one resistance element is used as sensor, but plural elements can be combined and arranged appropriately, and a sensor of temperature compensation type is composed.

Also in the embodiment, the sensor for detecting the deformation of the thin film is formed in part of the thin film, and it is only intended to form the sensor to so that the detecting part of the sensor may be also deformed depending on the deformation of the thin film, but the thin film and sensor may not be always formed integrally and inseparably.

As described herein, according to the embodiment, by assembling a sensor for high precision feedback over a wide range of deflection amount of the thin film forming the reflecting mirror, in the frame member of the variable shape mirror, small size and high performance can be realized at the same time, particularly in a variable shape mirror to be driven by a small pressure difference.

Therefore, in the second embodiment of the invention, since the deformation of the thin film itself is detected, if driving by a small pressure difference by extremely lowering the film rigidity, a variable shape mirror having a deformation measuring function of small size and low cost capable of measuring an accurate deflection amount can be presented.

As explained herein, according to the second embodiment of the invention, since the deformation of the thin film itself is detected, if driving by a small pressure difference by extremely lowering the film rigidity, an accurate deflection measurement is possible, and further since the outer circumference is increased in film thickness by the presence of the polyimide film, the deformation amount in this region is small, and therefore a variable shape mirror having a deformation measuring function of small size and low cost capable of controlling by feedback by feedback accurately against deflection in a relatively wide range can be presented.

(Third Embodiment)

A third embodiment of the invention is explained by referring to FIGS. 6A and 6B, and FIGS. 7A and 7B.

Figure 6A:
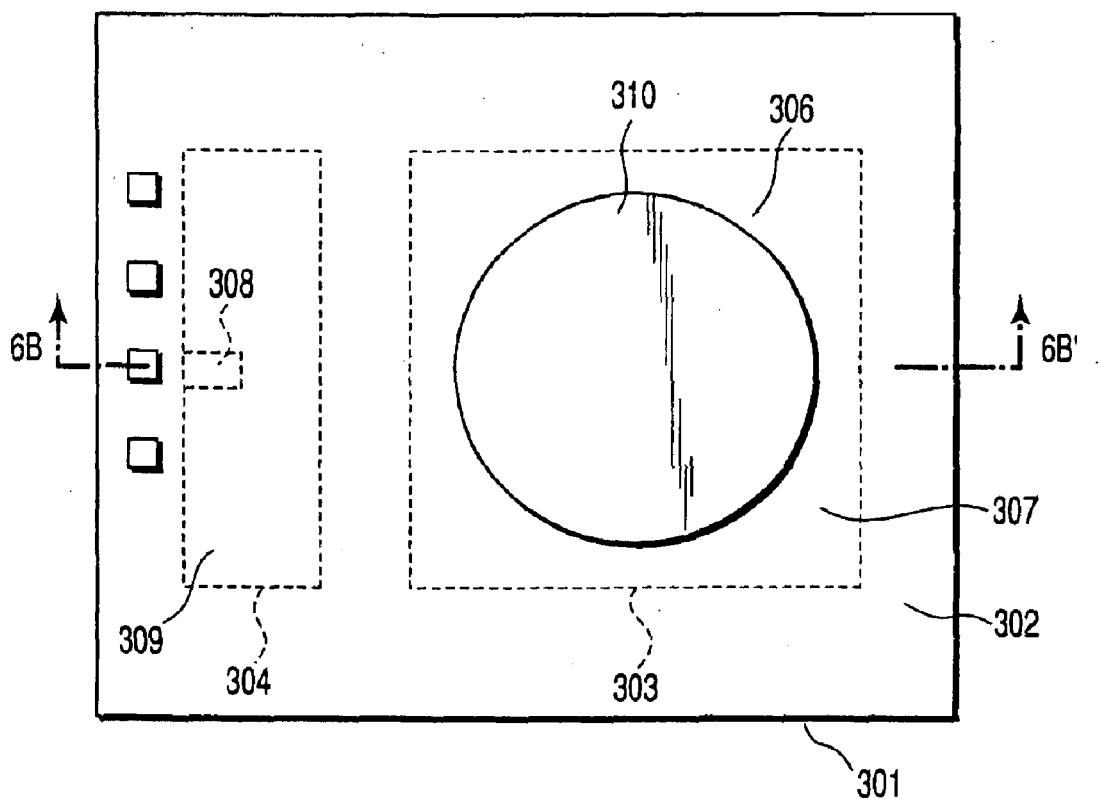
FIGS. 6A and 6B are a top view of detail of variable shape mirror 301 according to a third embodiment of the invention, and its 6B–6B' sectional view.
Figure 6B:
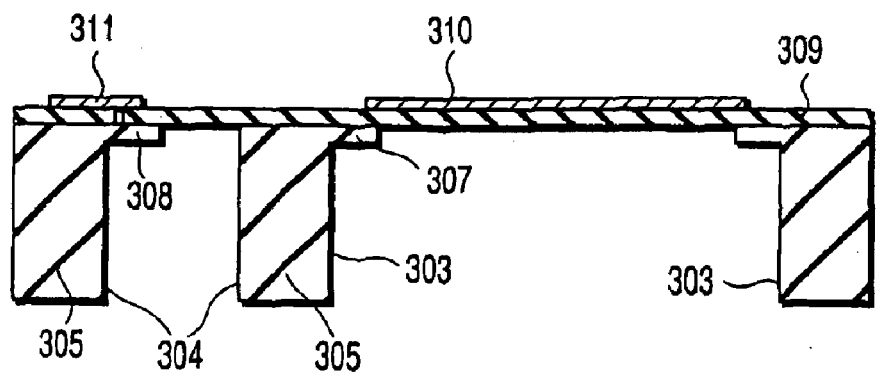

In this embodiment, too, the general configuration is nearly same as in FIG. 4, and FIGS. 6A and 6B show detail of the variable shape mirror section.

That is, FIGS. 6A and 6B are a top view of detail of variable shape mirror 301 according to the third embodiment of the invention, and its 6B–6B' sectional view.

As shown in FIGS. 6A and 6B, in the variable shape mirror 301 of the embodiment, a frame member 302 made of P type single crystal silicon includes a thick film region 305 having a rectangular first opening 303 and a rectangular second opening 304, a thin film region 307 having a circular first opening 306 disposed in the rectangular first opening 303, and a thin film protrusion 308 projecting from the center of one longer side disposed in the rectangular second opening 304.

Herein, the thin film region 307 and thin film protrusion 308 are obtained by forming a relatively deep low concentration diffusion layer of N type in the single crystal silicon substrate of P type, biasing this region positively, and etching electrochemically from the back side by using an aqueous solution of potassium hydroxide or the like.

Further, a polyimide film 308 is formed on the entire surface of the frame member 302 including the rectangular first opening 303 and rectangular second opening 304.

In the region of the circular first opening 306, a reflecting film 310 made of Al thin film is formed, and on the polyimide film 309 near the protrusion 308, the reflecting film 310 and an Al wiring pattern 311 formed simultaneously therewith are formed.

The protrusion 308 and Al wiring pattern 311 are explained in detail below by referring to FIGS. 7A and 7B.

Figure 7A:
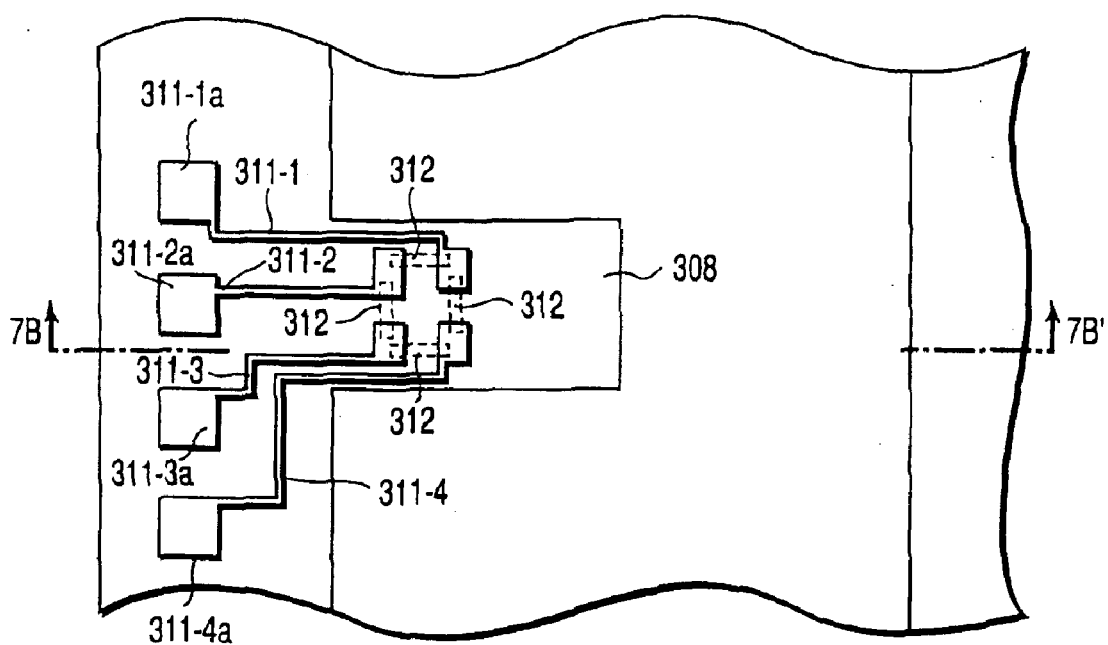
FIGS. 7A and 7B are a top view explaining the detail of protrusion 308 and Al wiring pattern 311 in FIGS. 6A and 6B, and its 7B–7B' sectional view.
Figure 7B:
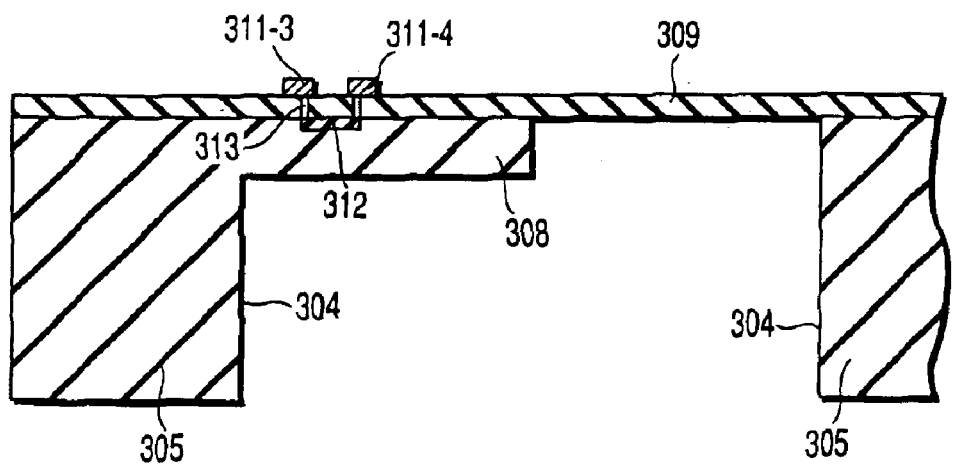
Figure 8A:
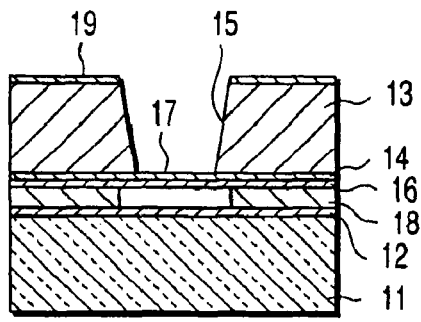
FIGS. 8A and 8B are a sectional view and a perspective view showing a configuration of reflecting mirror device by electrostatic attraction driving system disclosed in Jpn. Pat. Appln. KOKAI Publication No. 2-101402 as prior art.
Figure 8B:
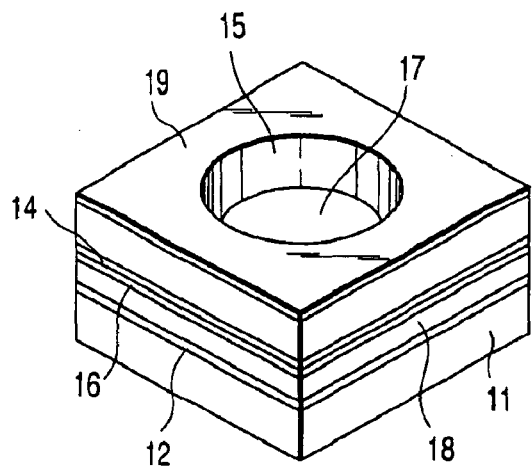
Figure 9A:
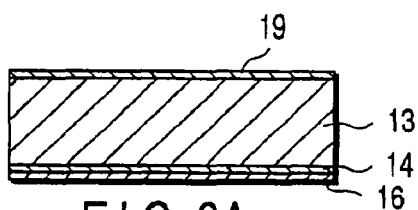
FIGS. 9A to 9E are sectional views showing the manufacturing process of the reflecting mirror device by electrostatic attraction driving system disclosed in Jpn. Pat. Appln. KOKAI Publication No. 2-101402 as prior art.
Figure 9D:
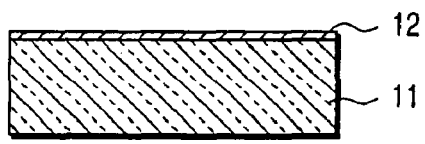
Figure 9B:
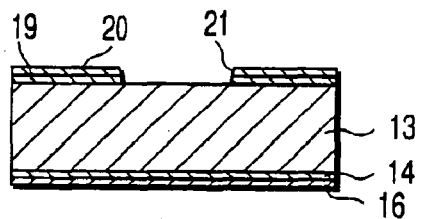
Figure 9C:
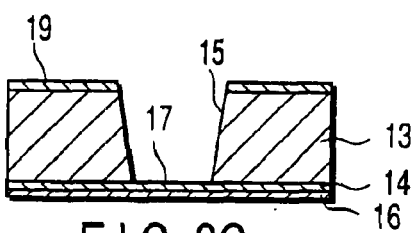
Figure 9E:
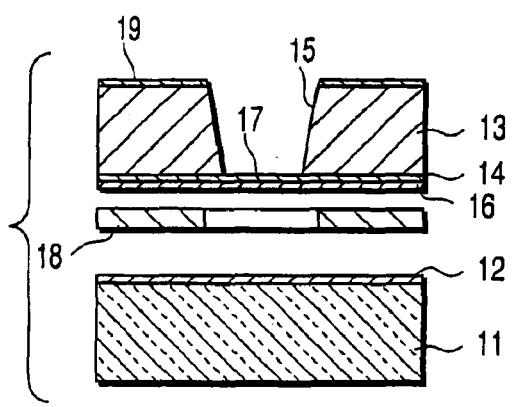
Figure 10:
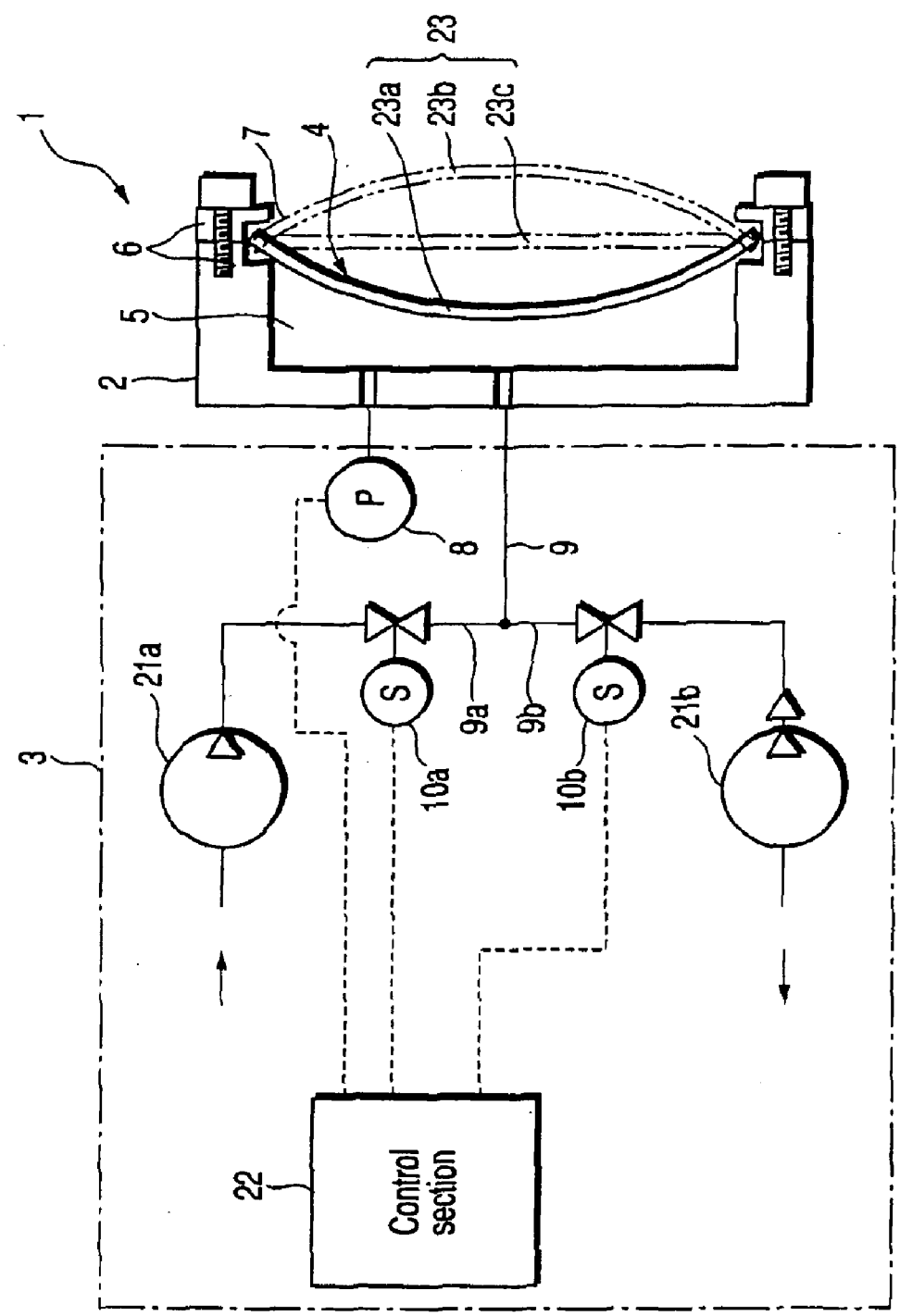
FIG. 10 is a diagram for explaining a technique disclosed in Jpn. Pat. Appln. KOKAI Publication No. 1-219801 as an example of variable shape mirror by fluid pressure drive as prior art.

That is, FIGS. 7A and 7B are a top view explaining the detail of protrusion 308 and Al wiring pattern 311 in FIGS. 6A and 6B, and its 7B–7B' sectional view.

As shown in FIGS. 7A and 7B, four shallow diffusion layers 312 of P type are formed near the root of the protrusion 308 of the thin film composed of N type diffusion layer.

Each P type shallow diffusion layer 312 forms a bridge circuit by Al wiring patterns 311-1, 311-2, 311-3, 311-4 connected through a contact hole 313.

The Al wiring patterns 311-1, 311-2, 311-3, 311-4 are drawn out to four electrode pads 311-1a, 311-2a, 311-3a, 311-4a formed on the thick film region 305.

Although not particularly shown in the drawing, the electrode pads 311-1a, 311-2a, 311-3a, 311-4a of the Al wiring patterns 311-1, 311-2, 311-3, 311-4 are connected to such a controller 214 as shown in FIG. 4 by means of external lead wires.

In this embodiment, too, the variable shape mirror 301 is hermetically sealed in the shell 205 as shown in FIG. 4, and in the rectangular first opening 303 and rectangular second opening 304, the thin films in these regions receive an equal pressure.

Therefore, by measuring the pressure of the rectangular second opening 304, the deformation shape of the reflecting film 310 can be controlled.

When a pressure is applied to the rectangular second opening 304, the polyimide film 309 in this region is deformed, and the protrusion 308 is slightly bent and deformed accordingly.

If the deformation of the polyimide film 309 is relatively large and elongation of this film is too large to be ignored, the rigidity of the protrusion 308 is sufficiently higher as compared with the polyimide film 309, and the elongation deformation is not relatively larger than the bending deformation, so that positive pressure and negative pressure can be distinguished in a wide pressure range.

Although the surface distortion of the protrusion 308 is small, the resistance value change to the distortion of the semiconductor diffusion layer is very large as compared with an ordinary metal thin film resistance, and therefore a relatively large output fluctuation is obtained as the output of the bridge circuit composed of the Al wiring patterns 311-1, 311-2, 311-3, 311-4, so that pressure measurement of high precision is possible, and the shape control of the reflecting film 310, that is, the reflecting plane is realized at high precision.

In the embodiment, since the diffusion layer 312 composing a bridge circuit of temperature self-compensation type is formed very closely to the protrusion 308, a stable measurement of a very small temperature drift is possible.

Moreover, since the reflecting plane portion (310) and sensor element (308) are formed in different openings 303, 304, rotational asymmetry does not occur about the mechanical strength of the reflecting plane portion (310) attributable to presence of sensor element (308), so that a favorable plane precision may be obtained.

In addition, the openings 303 and 306 of the reflecting plane portion (310) are preferred to be formed in circular or elliptical shape in order to suppress astigmatism, but by forming other opening 304 for disposing the sensor element (308), the opening shape can be optimized in consideration of the linearity of the output of the sensor element (308).

Therefore, as explained herein, according to the third embodiment of the invention, since the deformation of the thin film itself is detected, the deflection can be measured accurately even in the case of driving by a small pressure difference by setting the film rigidity very low, and moreover since the first thin film (reflecting plane) and second thin film (sensor element) are formed in different openings, rotational asymmetry does not occur about the mechanical strength of the reflecting plane portion attributable to presence of sensor element, so that a favorable plane precision may be obtained, and therefore the variable shape mirror of small size and low cost having an excellent deformation measuring function is presented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A variable shape mirror comprising:

a frame member having an opening; and a thin film having a first region including a reflecting plane and a second region of higher rigidity than the first region disposed in the outer periphery of the first region, being supported in the opening of the frame member.

2. The variable shape mirror according to claim 1, further comprising:

a substrate bonded to the frame member at a specified interval by way of a spacer; and wherein a space between a portion of the frame member having the opening and the substrate is not closed.

* * * * *